United States Patent [19]

Kammiller

[11] Patent Number: 4,525,674

[45] Date of Patent: Jun. 25, 1985

[54] CIRCUIT FOR SYNCHRONIZING A SWITCHING POWER SUPPLY TO A LOAD CLOCK

[75] Inventor: Neil A. Kammiller, Lakewood, Ohio

[73] Assignee: Reliance Electric Company, Cleveland, Ohio

[21] Appl. No.: 402,628

[22] Filed: Jul. 28, 1982

[51] Int. Cl.³ .................. H03K 1/17; H03K 7/00; H03K 17/00; H03K 17/26

[52] U.S. Cl. .................... 328/63; 307/529; 307/269; 328/72

[58] Field of Search ........... 328/63, 133, 140, 179, 328/72; 307/480, 527, 529, 271, 269, 273; 375/108

[56] References Cited

U.S. PATENT DOCUMENTS

| | | |
|---|---|---|
| 3,660,690 | 5/1972 | Theodore ............ 307/273 |
| 3,930,250 | 12/1975 | Blejwas, Jr. et al. ........ 328/72 |
| 3,959,730 | 5/1976 | Weber et al. ............ 307/480 |
| 4,187,439 | 2/1980 | Vesel ............ 307/273 |
| 4,260,912 | 4/1981 | Bjorke ............ 307/273 |
| 4,369,515 | 1/1983 | Valdes ............ 328/72 |
| 4,386,323 | 5/1983 | Jansen ............ 328/63 |

Primary Examiner—Stanley D. Miller
Assistant Examiner—Timothy P. Callahan
Attorney, Agent, or Firm—Michael M. Rickin

[57] ABSTRACT

Circuitry for use in a power supply of the type which includes a power switching means and uses a waveform of predetermined shape to control the power switching means such as in a first mode the supply regulates its output voltage and in a second mode controls the current in the power switching means. The circuitry synchronizes the frequency of the waveform to the master clock frequency of the load connected to the supply.

10 Claims, 5 Drawing Figures

CIRCUIT FOR SYNCHRONIZING A SWITCHING POWER SUPPLY TO A LOAD CLOCK

BACKGROUND OF THE INVENTION

1. Field of the Invention

The present invention relates to power supplies and more particularly to circuitry adapted for use in conventional power supplies of the pulse width modulated (p.w.m.) type to provide for frequency synchronization.

2. Description of the Prior Art

Many types of power supplies now make use of the well-known pulse width modulation (p.w.m.) technique to provide a signal to drive one or more power switching devices at a relatively high frequency. The p.w.m. technique makes use of a sawtooth waveform of predetermined frequency usually in the order of 20 kilohertz for purposes of generating the drive signal to the power switching devices. While the p.w.m. circuitry may be embodied by using any one of the circuit configurations well known in the art, it has become increasingly common to use devices such as integrated circuit chips to embody the p.w.m. circuitry. These chips ordinarily include an internal clock which provides the sawtooth waveform.

The supply which uses the p.w.m. technique is ordinarily connected to a load to provide power thereto. The load may, for example, be a computer controlled device which also has its own internal clock. The computer clock has a frequency which is typically in the order of several megahertz. Quite often the computer clock may be divided down in order to provide a variety of clock frequencies to the circuits contained therein. Ordinarily the internal clock of the p.w.m. chip is not at a frequency which is exactly the same as the frequency of the nearest whole number submultiple of the computer clock. This whole number submultiple will be referred to hereinafter as the master clock. Having different frequencies for the master clock and the p.w.m. internal clock gives rise to signal components having frequencies which represent the sum and difference of those frequencies. These components then appear as noise within the computer and may interfere with the operation thereof. It is, therefore, desirable that the clock frequency of the p.w.m. chip be synchronized with the frequency of the master clock of the load and thereby minimize the occurrence of any such noise.

SUMMARY OF THE INVENTION

According to the present invention, there is disclosed a power supply and circuits for use therein. The power supply is of the type which includes a power switching means and uses a waveform of predetermined shape to control the power switching means operation to thereby in a first mode regulate the voltage at the supply output and in a second mode control the current in the power switching means. The supply switches to its second mode of operation when the current exceeds a predetermined amplitude. The supply also includes a fuse in series with one of its two outputs.

According to the present invention, there is disclosed a synchronizing circuit for use in the power supply for synchronizing the frequency of the waveform of predetermined shape to the master clock frequency in the load. The circuit includes means which generates a syncing signal for each cycle of the master clock. A timing means generates pulses at a first predetermined rate in the absence of syncing signals and at a second predetermined rate in response thereto. A circuit means then generates the waveform of predetermined shape with a first frequency when there are no timing means pulses, at a second frequency when the timing means pulses are generated at the first rate and at a third frequency when the pulses are generated at the second predetermined rate.

DESCRIPTION OF THE PREFERRED EMBODIMENTS

Figure 1:
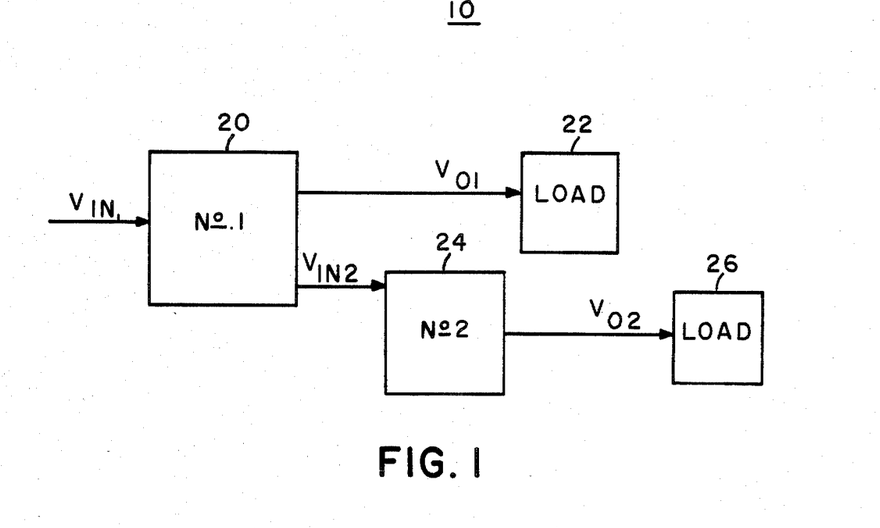
FIG. 1 is a block diagram of a typical power supply system in which the present invention may be used.

Referring to FIG. 1 there is shown a converter 10 which provides from a single input voltage, designated as $VIN_1$, at least two regulated output voltages, designated as $V_{O1}$ and $V_{O2}$, respectively. Converter 10 includes a first power supply 20 which generates at a first output from the voltage $VIN_1$ the regulated voltage $V_{O1}$ to thereby supply power to load 22. Supply 20 also generates at a second output from $VIN_1$ an unregulated voltage designated as $VIN_2$. This voltage is the input voltage to a second power supply 24 which generates at its output the regulated output voltage $V_{O2}$ which is used to supply power to load 26. First supply 20, therefore, provides both a regulated output voltage to the load 22 connected thereto and an unregulated output voltage which is used as the input to a second supply 24.

As first supply 20 provides the input voltage for second supply 24, the second supply and its load 26 may also be considered to be a load on supply 20. While FIG. 1 has shown first supply 20 providing the input voltage only to one other supply, it should be appreciated that supply 20 may provide the input voltage for a number of additional supplies arranged in the manner of supply 24. It should further be appreciated that while FIG. 1 has shown separate loads 22 and 26 connected to supplies 20 and 24, these loads may be part of a single load such as a computer wherein supplies 20 and 24 each may provide a different regulated voltage for use in the load.

Figure 2A:
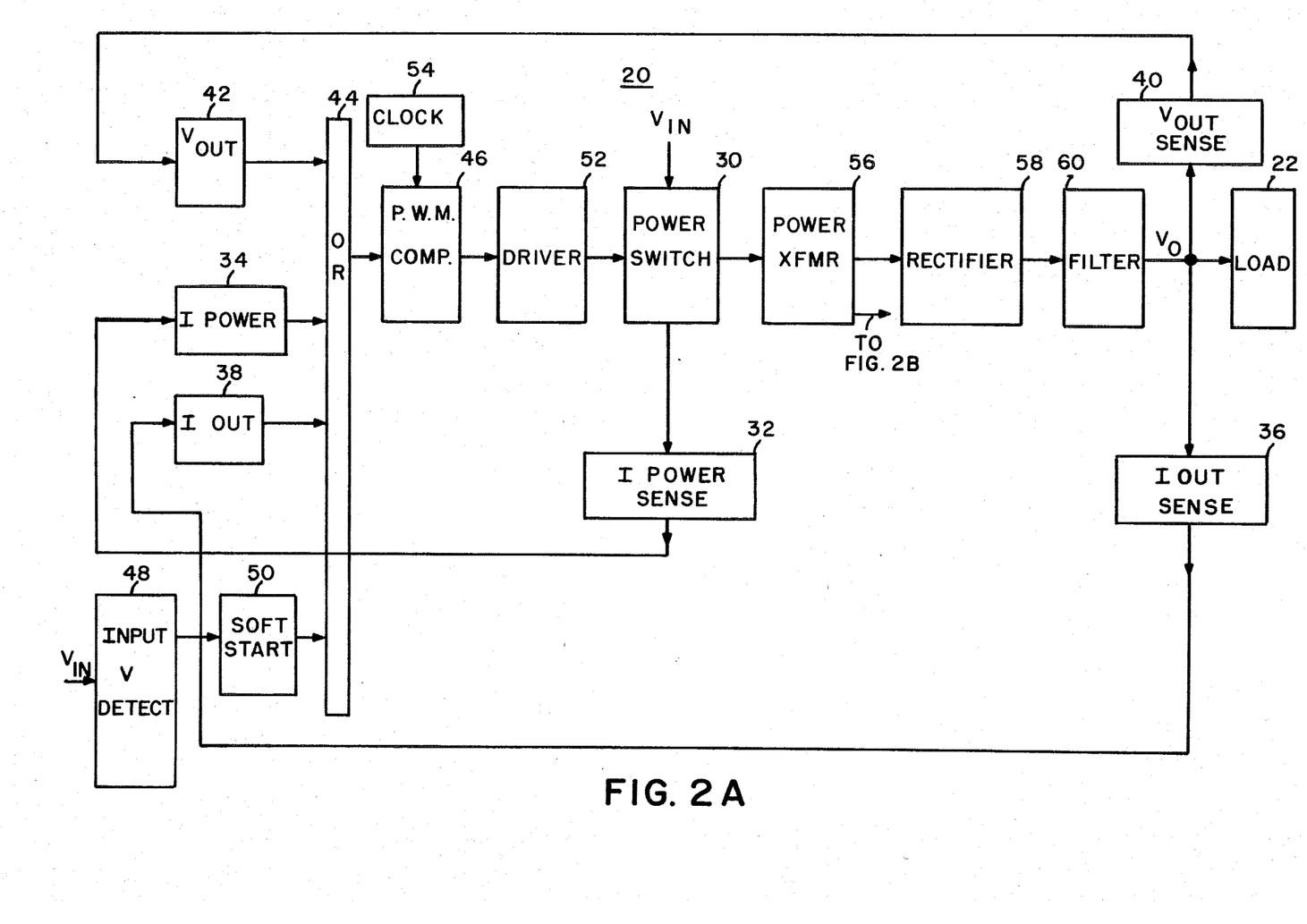
FIGS. 2a and 2b are block diagrams of typical embodiments for the two power supplies of the system shown in FIG. 1.

Referring to FIG. 2a there is shown a block diagram for a typical embodiment of first supply 20. Supply 20 is of the type wherein a power switch 30 is turned on and off by the use of the well-known pulse width modulation (p.w.m.) technique. The operation of supply 20 is controlled as a function of either its output voltage or output current or current in the power switch 30. Supply 20 includes a circuit 32 which is used to monitor the current in the power switch 30. As is well known in the art, it is desirable to monitor the current in the power switch so as to be able to control the switching of switch 30 in the event that excessive current should flow therein.

The current in switch 30 may be monitored by a transformer. The sensing transformer is connected to a circuit 34 which generates a d-c signal which is representative of the current being monitored. Circuit 34 then compares that d-c signal to a predetermined reference signal. Circuit 34 may be embodied by the combination of a first diode having its anode connected to one end of the secondary winding of the monitoring transformer and its cathode connected to the parallel combination of a resistor and a capacitor which provides a load for the monitoring transformer. The first diode disconnects the load when the power switch is off to thereby allow the monitoring transformer to be reset. In this manner, energy which is stored in the transformer core during the time the transformer is set is not dissipated across the transformer load. A peak charging circuit including a diode, a capacitor and a resistor may then be connected across the load to generate a d-c voltage representative of the current being monitored.

The d-c signal representative of the current is stored in the capacitor of the peak charging circuit and is one input to an operational amplifier functioning as an analog comparator. The other input to the comparator is a d-c signal which corresponds to a predetermined current. When the current being monitored reaches or exceeds the predetermined amplitude, the switching of the power switch is then controlled by circuit 34 to thereby regulate the current to the predetermined amplitude.

As supply 20 provides not only a regulated voltage $V_{O1}$ to its own load 22 but also provides a voltage $VIN_2$ to a second supply 24, it is necessary that supply 20 not only monitor the current in switch 30 but also monitor the current $I_{O1}$ provided to load 22. This current may be monitored by sensing the current through a suitably arranged circuit 36 and generating a voltage representative thereof. Sensing circuit 36 is connected to a circuit 38 which first generates a d-c voltage representative of $I_{O1}$ and then compares this voltage to a predetermined reference. The portion of circuit 38 which generates the representative d-c voltage may be embodied as described previously for circuit 34. The representational d-c voltage is connected as one input to an operational amplifier, the other input of which is connected to receive the predetermined reference voltage. The operational amplifier is arranged to change its state when the output current exceeds the reference.

Supply 20 must also monitor its output voltage, $V_{O1}$, to maintain regulation thereof. A sensing circuit 40 is used to provide a sample of $V_{O1}$ to circuit 42 which compares two voltages. One of the voltages compared by circuit 42 is simply a voltage proportional to $V_{O1}$ and may be obtained by use of a resistive voltage dividing network having $V_{O1}$ as its input voltage. The other voltage compared by circuit 42 is a reference voltage which may be provided by the combination of a zener diode and a resistive network including an adjustable resistor.

Each of the outputs of circuits 34, 38 and 42 are provided as inputs through OR circuit 44 to p.w.m. comparator circuit 46. The output of supply 20 is then controlled by circuit 46 as a function of either the output voltage or current or the current in power switch 30. A clock circuit 54 provides the sawtooth waveform which circuit 46 uses in its comparison. While circuits 34, 42, 44, 46 and 54 have been shown as separate, they may be embodied by an integrated circuit chip such as type 494 which is available from manufacturers such as Texas Instruments or Motorola.

Sometimes it is desirable to provide circuitry which ensures that the p.w.m. circuitry of the supply does not provide a usable output to switch 30 until such time as the input voltage to the supply reaches a predetermined amplitude. This circuitry is provided in the form of input voltage detector 48 and soft start circuit 50, the output of which is connected as another input to OR circuit 44. The input voltage to supply 20 may, for example, be provided from a d-c source such as the bank of batteries located at a typical telephone operating company central office.

Detector circuit 48 may, for example, be embodied by an operational amplifier one input of which receives a predetermined reference voltage generated from a stable source such as a zener diode in combination with a resistive voltage dividing network. The other input to the operational amplifier may be connected by a voltage dividing network to receive a voltage representative of the input voltage to supply 20. When the input voltage exceeds the reference voltage, the operational amplifier changes its state to provide a signal to soft start circuit 50.

Soft start circuit 50 may be embodied, for example, by a capacitor which prior to the change in state of the operational amplifier in circuit 48 has been held discharged by a transistor. One end of the capacitor may be connected to a predetermined voltage. The other end of the capacitor is connected to the appropriate one of the inputs of the 494 chip when the p.w.m. circuitry is so embodied. When the operational amplifier changes states, the transistor then allows the capacitor to charge down to common (0V). In response thereto the chip is activated to thereby provide a usable output to switch 30 and associated driver circuit 52.

Supply 20 also includes a power transformer 56 whose primary winding is connected in series combination with switch 30. Connected to the secondary winding of the transformer is the combination of rectifier 58 and filter 60. Transformer 56 also includes an additional secondary winding which is used to provide the input voltage to supply 24. The circuitry which may be used to embody switch 30, transformer 56, rectifier 58 and filter 60 depends on the type of switched mode power architecture that is used for supply 20. For example, if supply 20 uses the well-known feed forward or, as it sometimes may be called, forward converter architecture, then energy is transferred to the load when power switch 20 is conducting. When the switch is turned off, part of the energy which is stored in filter 60 is transferred to the load through a commutating or freewheeling diode (not shown) which is connected in shunt between rectifier 58 and filter 60. Rectifier 58 may be embodied in its simplest form by a diode connected in series with the secondary winding of transformer 56. Filter 60 may be embodied in its simplest form by an L-C network in which the inductor is in series with the rectifier diode. It is the energy stored in the inductor which is transferred to the load during the off time of switch 30.

Figure 2B:
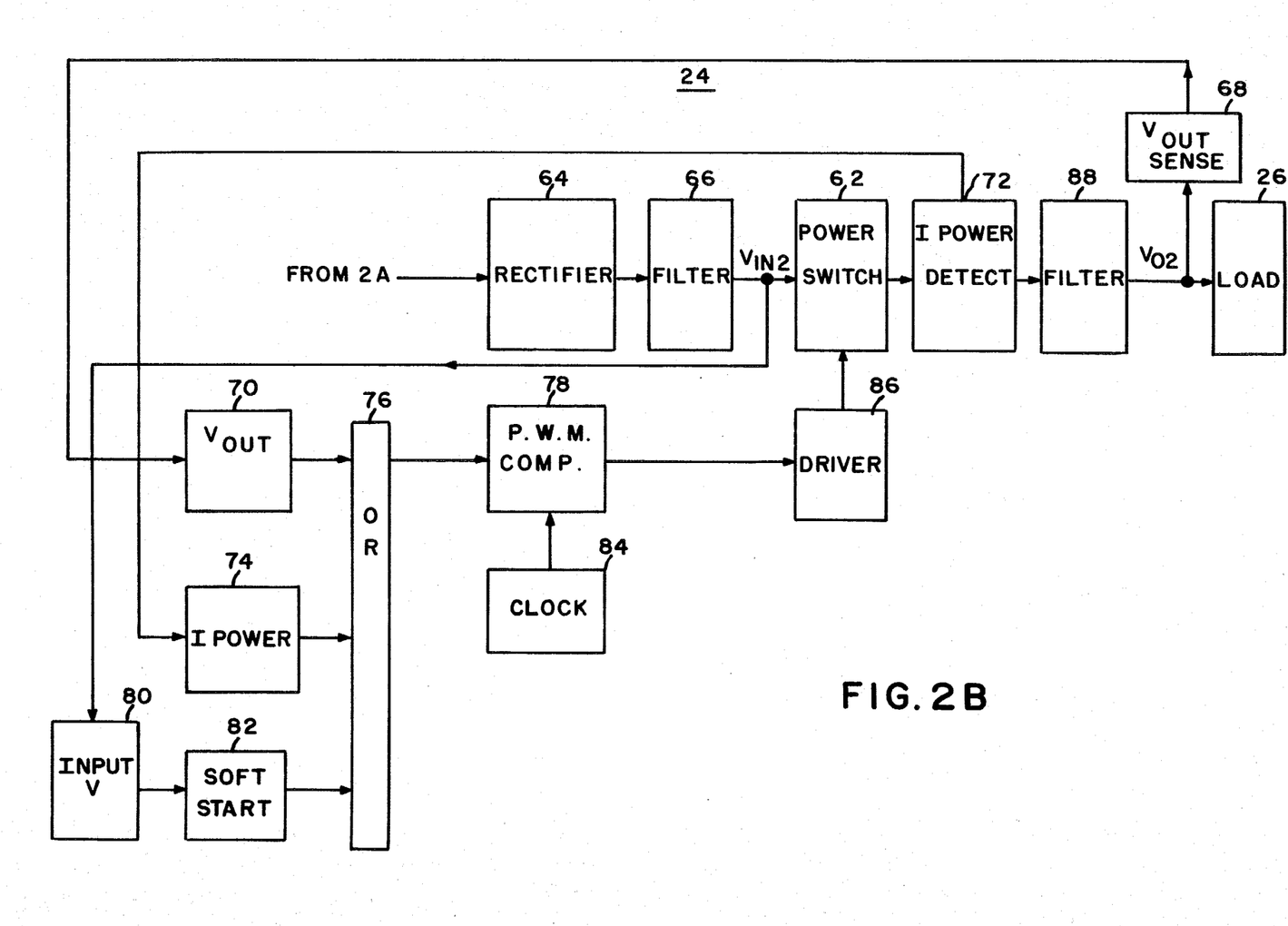

Referring to FIG. 2b there is shown a block diagram for a typical embodiment of second supply 24. Supply 24 also utilizes the p.w.m. technique to control the operation of power switch 62. The operation of supply 24 is controlled as a function of either its output voltage or the current in power switch 62. It is not necessary to monitor the output current of supply 24 as the supply provides voltage only to load 26.

Supply 24 is similar in structure to supply 20 and, as pointed out hereinafter, most of the blocks shown in FIG. 2b may be embodied by the type of circuitry described previously for the corresponding blocks of supply 20. As described above, supply 24 receives its input voltage from the secondary winding of supply 20. This unregulated voltage is rectified and filtered by circuits 64 and 66 to provide the voltage designated as $VIN_2$ to supply 24. Circuits 64 and 66 may be embodied as described previously for rectifier 58 and filter 60 of supply 20. When supply 20 is of the feed forward type, then a commutating diode (not shown) is connected in shunt between rectifier 64 and filter 66.

Supply 24 also includes output voltage sensing circuit 68 which is used to provide a sample of the output voltage $V_{O2}$ to a circuit 70. As described previously for supply 20, circuits 68 and 70 allow supply 24 to maintain regulation of its output voltage. Circuits 68 and 70 may be embodied as described previously for corresponding circuits 40 and 42 of supply 20.

Supply 24 also includes detecting circuit 72 which is used to monitor the current flowing in power switch 62 and provide a sample thereof to circuit 74. As described previously for supply 20, circuits 72 and 74 allow supply 24 to control the current flowing in switch 62. Circuits 72 and 74 may be embodied as described previously for corresponding circuits 32 and 34 of supply 20.

When circuits 70 and 74, OR circuit 76, p.w.m. comparator circuit 78 and clock circuit 84 are shown as individual units in FIG. 2b, they may, for example, be embodied as was described previously for corresponding circuits 44, 46 and 54 of supply 20 by the 494 chip. Supply 24 also includes, as did supply 20, an input voltage detection circuit 80 and a soft start circuit 82. These circuits are included for the reasons described previously in connection with circuits 48 and 50 of supply 20 and function and may be embodied as described therein.

Supply 24 is of the type in which switch 62 in response to the signal from driver circuit 86 chops the d-c voltage $VIN_2$. In each cycle of operation the conduction time of power switch 62 is controlled by p.w.m. comparator 78 to provide either a regulated voltage to load 26 or in response to excessive current flowing in switch 62 to reduce the output voltage and thereby reduce the current to a predetermined reference. A filter circuit 88 which may be embodied as described previously for filter 60 of supply 20 provides at its output the d-c voltage $V_{O2}$.

Figure 3A:
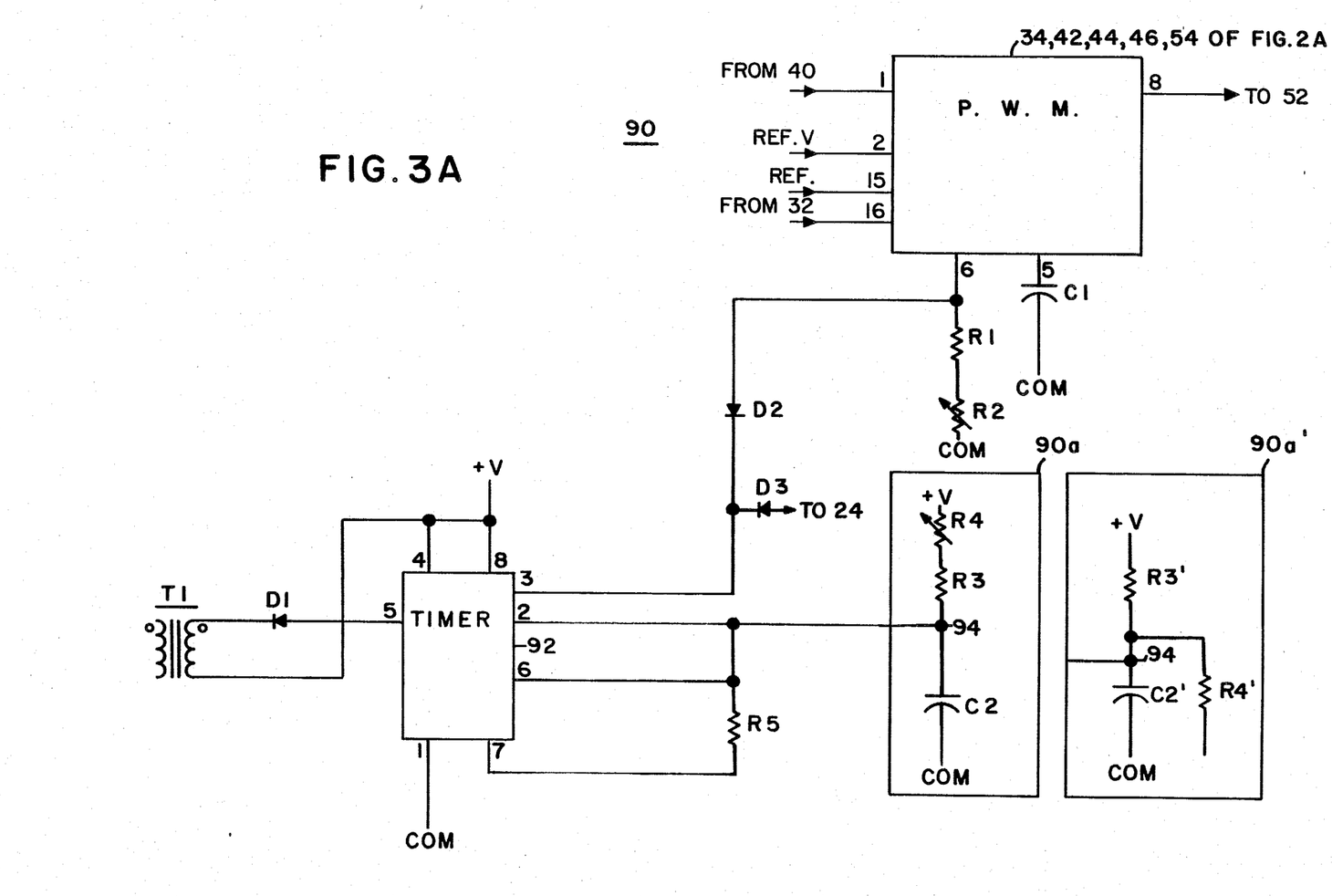
FIGS. 3a and 3b are schematic diagrams of various embodiments for the synchronizing circuit of the present invention.
Figure 3B:
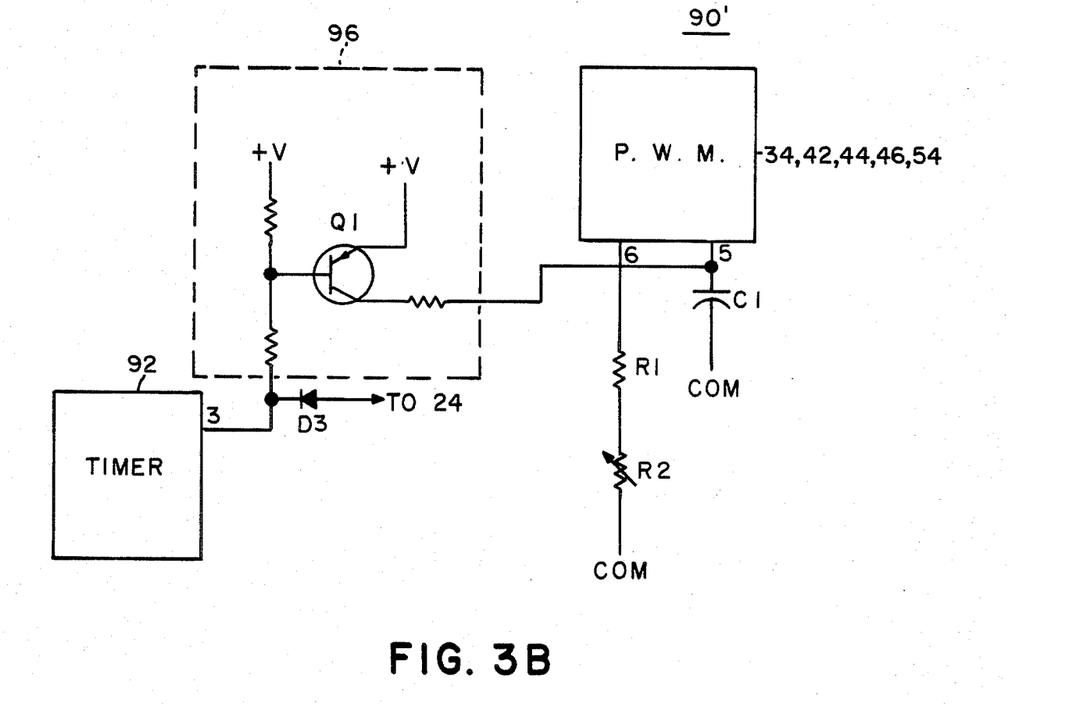
Figure 4:
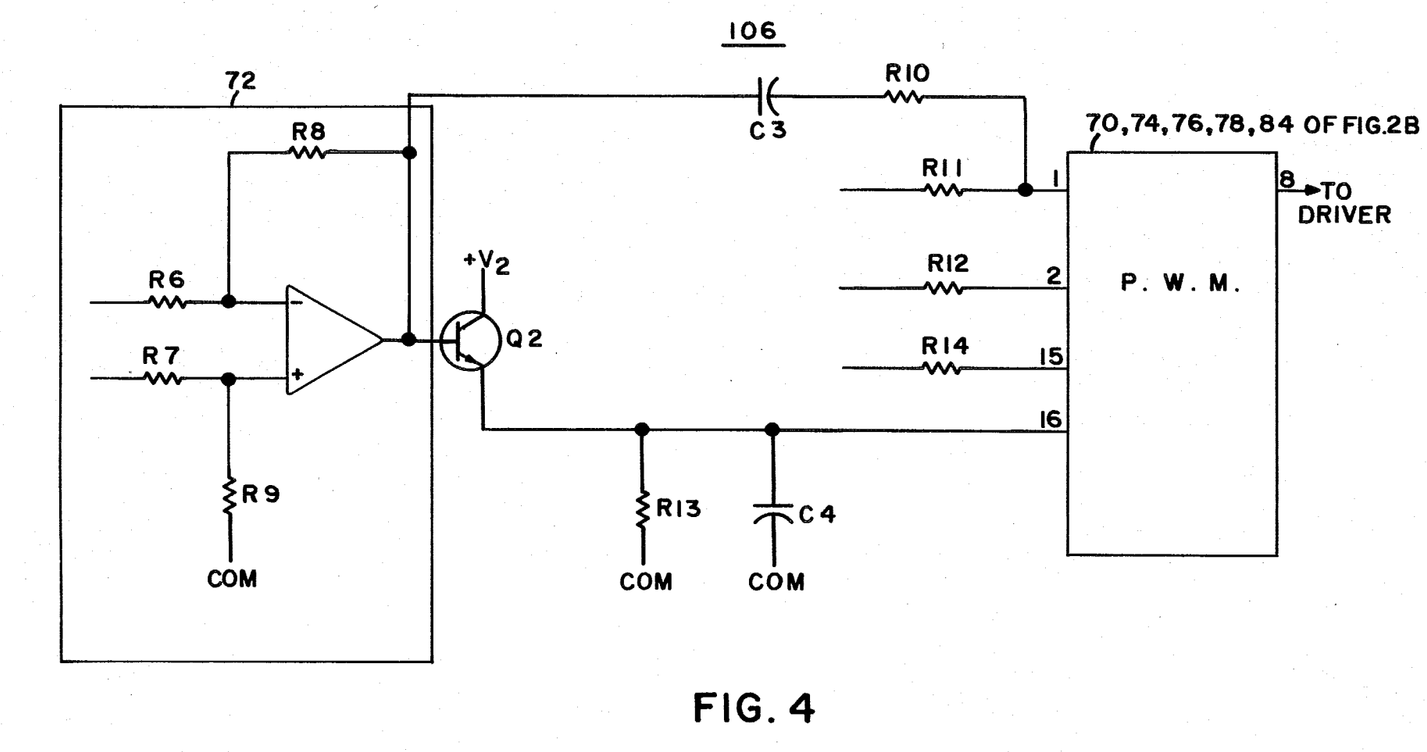
Figure 5:
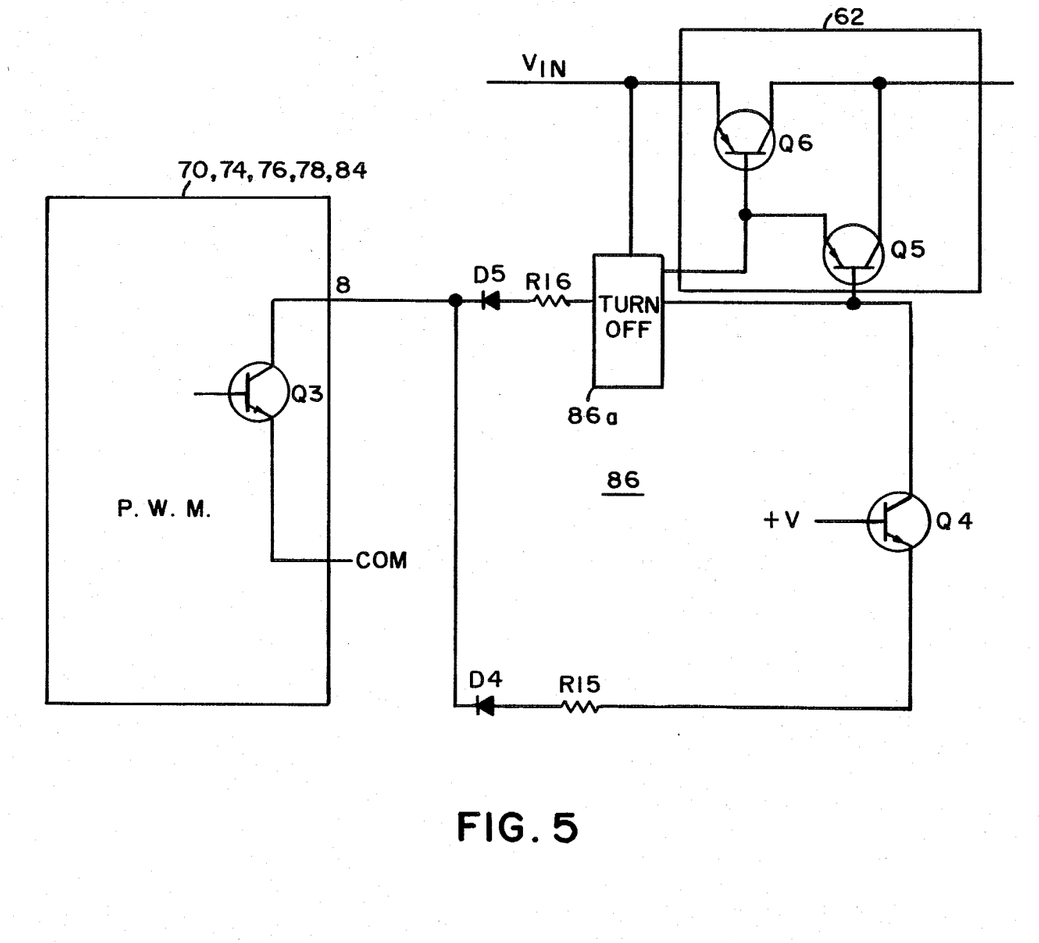
Figure 6:
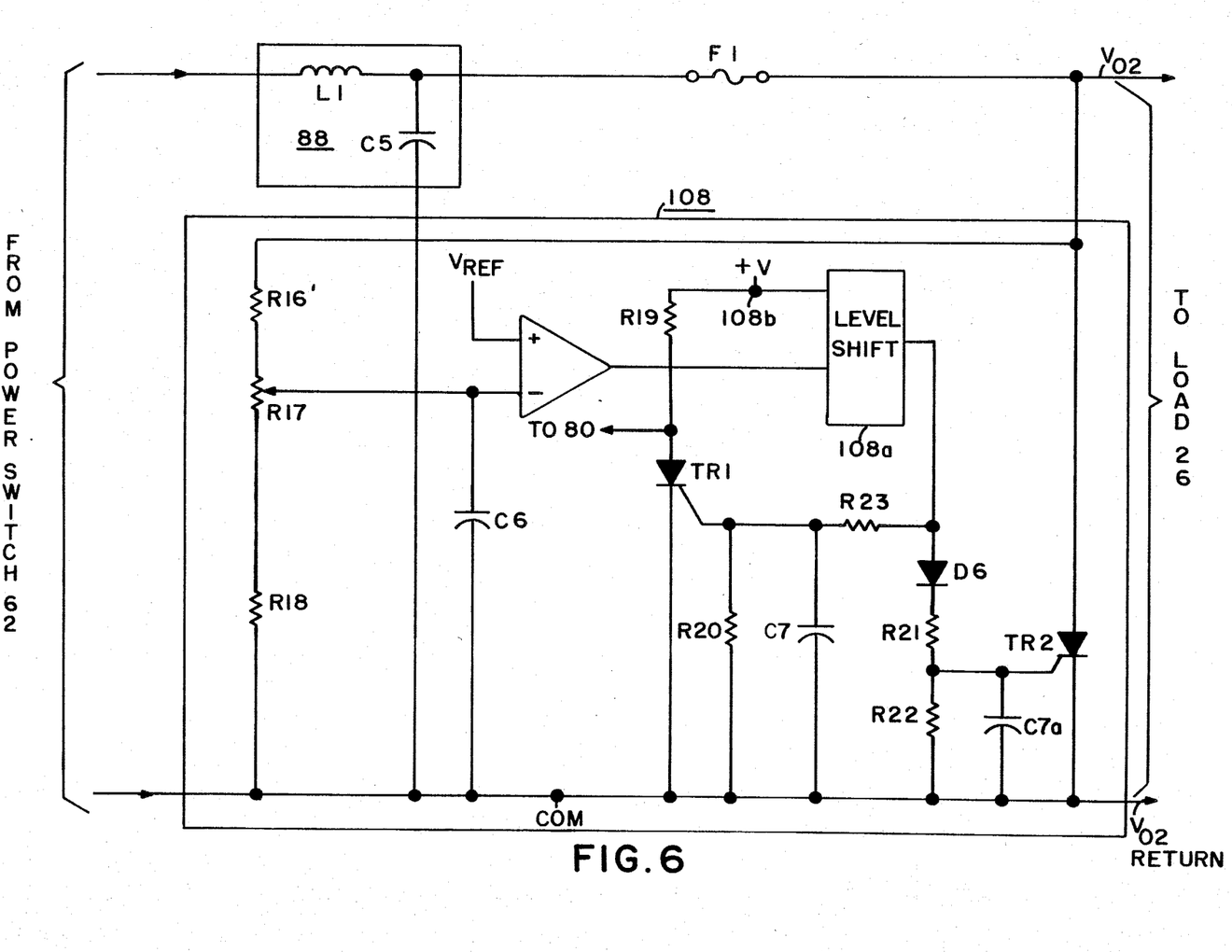

In FIGS. 3a and 3b there are shown alternative embodiments for circuits which may be included in supply 20 and used to accomplish the synchronization of the clock frequency of the p.w.m. circuitry of the supply and the frequency of the master clock in the load 22. While in describing each of these circuits it is assumed that the p.w.m. circuitry of the supply is embodied by the 494 chip, it should be appreciated that these synchronizing circuits may be used in connection with any embodiments of the p.w.m. circuitry wherein that circuitry would ordinarily have an internal clock frequency which is different than the frequency of the load's master clock.

Referring to FIG. 3a there is shown the schematic diagram of one embodiment of the circuit 90 for providing synchronization between the internal clock of the p.w.m. chip and the master clock of the load. The 494 p.w.m. chip includes pin 5 to which one end of a capacitor C1 is connected and pin 6 to which one end of the series combination of a fixed resistor R1 and an adjustable resistor R2 are connected. The other ends of the capacitor and the series resistor combination are connected to the common (COM) of supply 20. Timing capacitor C1 and resistors R1 and R2 form an R-C circuit which determines the internal clock frequency of the chip.

The chip also includes an input pin 1 which is connected to receive the sample of the supply output voltage from sensing circuit 40. Input pin 2 of the chip is connected to a source (not shown) which provides a reference signal for the output voltage. The chip includes an internal comparator which compares the sample of supply output voltage received on input pin 1 to the reference voltage received on input pin 2 to thereby control the width of the chip output signal as a function of the supply output voltage. The output signal of the chip appears on pin 8 thereof which is connected to driver 52 of supply 22. The p.w.m. chip further includes input pins 15 and 16 which are connected to a comparator internal to the chip which controls the output signal on pin 8 as a function of the current in the power switch. The output of circuit 32 is connected to input pin 16. Also there may be connected to pin 16 the parallel combination of a resistor and a capacitor (not shown) which provide stability for the control loop of the supply. Pin 15 is connected to a reference signal which represents the amplitude of power switch current at which the supply changes from operation in the voltage regulated mode to operation in the current regulated mode.

Pin 6 of the chip is also connected by the diode D2, poled as shown, to the output of a timing circuit 92. It is circuit 92 which provides the pulse to the p.w.m. chip which ordinarily forces the internal clock thereof to run at the same frequency as the master clock. Circuit 92 may be embodied by any one of a number of commercially available timing chips such as the 555 type available from National Semiconductor. For ease of description, it is assumed that the 555 type is used in FIG. 3a to embody circuit 92 and the various pin numbers shown in connection therewith correspond to the actual pin numbers for that timer type.

For each cycle of the master clock a negative-going pulse appears at the dotted end of the primary winding of transformer T1. This pulse will be referred to hereinafter as the sync pulse. The transformer T1 provides isolation and the sync pulse is coupled to its secondary winding, the dotted end of which is connected by a diode D1, poled as shown, to pin 5 of timer 92. The nondotted end of the secondary winding is connected to pins 4 and 8 of the timer and they in turn are connected to a positive voltage, $+V$.

In the absence of sync pulses, timer 92 runs at a frequency which is determined by the series timing circuit 90a formed by the combination of capacitor C2 and fixed resistor R3 in series with adjustable resistor R4. One end of capacitor C2 is connected to supply common and the other end is connected at junction 94 to one end of resistor R3. This junction is in turn connected to pins 2 and 6 of timer 92. The other end of resistor R3 is connected to one end of resistor R4 which has its other end connected to the positive voltage, $+V$. Pin 6 of the timer is connected by a resistor R5 to pin 7 thereof. This resistor in combination with capacitor C2, as will be described hereinafter, determines the width of the pulse which appears at timer output pin 3.

In the absence of sync pulses, timer 92 runs at the frequency determined by the timing circuit 90a. Internal to the timer is a resistive divider network (not shown) which in the absence of sync pulses allows the timer to generate a sawtooth at the timing circuit determined frequency. In each cycle this sawtooth starts at the lower threshold voltage, $+V/3$, and terminates when capacitor C2 has charged to the upper threshold, +2 V/3. The timer then generates at pin 3 a negative-going pulse whose width is determined by R5 and C2. The occurrence of a sync pulse causes the internal sawtooth of the timer to prematurely terminate as the sync pulse reduces the upper threshold voltage to be less than +2 V/3. In the presence of sync pulses, timer 92, therefore, generates pulses at its output which occur at a frequency which is higher than the frequency at which the pulses would occur if determined solely by the timing circuit.

As described previously, the dotted end of the secondary winding of transformer T1 is connected to pin 5 of the timer by diode D1. This diode decouples the transformer from the timer in the absence of sync pulses. As described above, the sync pulse occurs once during each cycle of the master clock. When the load is a computer controlled device, the master clock has been derived from the computer's internal clock. Under certain circumstances the load may cease generating the master clock. One such temporary cessation occurs when the load is of the type which monitors its own clock for drift. If the load clock should drift beyond predetermined limits, the sync pulses are terminated. In that case it would be desirable for timer 92 to continue to generate a pulse at pin 3 even if this pulse is at the lower frequency determined by the timing circuit. Diode D1 ensures that the timing circuit will operate in this manner in the absence of sync pulses.

Timing circuit 90a, as described above, includes adjustable resistor R4. It may be desirable to replace this timing circuit with one which does not use an adjustable resistor but only fixed resistors. Removing the adjustable resistor from the timing circuit eliminates the possibility that the resistor and, therefore, the circuit will be misadjusted. A timing circuit which uses only fixed resistors and which may be used to replace circuit 90a without the necessity of additional changes in circuit 90 is also shown in FIG. 3a and is designated as 90a'. Not only does circuit 90a' provide the desirable results described above, but, as will be described hereinafter, it also is designed such that timer 92 does not free run in the absence of sync pulses.

The principal differences between the two timing circuits are that in circuit 90a' a fixed resistor R3' is connected between junction 94 and the positive voltage +V and a fixed resistor R4' is connected in parallel with capacitor C2' between junction 94 and circuit common. In the absence of sync pulses, capacitor C2' charges to a voltage, Vc2', which is given by the equation:

$$Vc2' = R4'/(R3' + R4') \cdot V$$

As described above, in the free running mode timer 92 terminates each cycle of the internal sawtooth when the voltage on the capacitor reaches $+\frac{2}{3}$ V. The value of voltage at which such termination occurs will be referred to hereinafter as the termination threshold. By selecting the value of the resistance of resistors R3' and R4', the voltage on the capacitor in the absence of sync pulses can be held to be below the termination threshold. Upon the occurrence of a sync pulse at pin 5 of the timer, the termination threshold, as described above, is caused to fall below the threshold present in the absence of sync pulses. If the resistances of resistors R3' and R4' are selected to not only cause the capacitor to reach a voltage which is below the threshold in the absence of sync pulses, but which is above the threshold in the presence of sync pulses, then timer 92 will generate the desired pulses at its output pin 3.

As mentioned above, the nondotted end of the secondary winding of T1 is connected to +V volts. This connection gives rise to a noise immunity of +V/3 volts in circuit 90. The connection ensures that at least +V/3 volts have to be developed across the transformer's secondary winding before a sync pulse will affect the operation of timer 92 in the manner described above. Under certain circumstances it may be desirable to connect a capacitor (not shown) between pins 1 (connected to supply common) and 5 of timer 92. Such a capacitor will act as a bypass and ensure that the voltage across the timer's internal divider is kept constant even if a high noise level source is supplying the timer.

The negative-going pulse generated at output pin 3 of timer 92 is connected by diode D2 to pin 6 of the p.w.m. chip. The p.w.m. chip operates at a frequency which is ordinarily determined by the combination of resistors R1 and R2 and capacitor C1. For its own internal usage the type 494 chip generates a sawtooth waveform each cycle of which terminates at a predetermined threshold. The chip generates the sawtooth by charging capacitor C1 from an internal current source. Upon the occurrence of the pulse at pin 3 of timer 92, the diode D2 is effectively connected into the timing circuit of the p.w.m. chip to momentarily lower the impedance of R1 and R2. This momentary lowering of impedance causes the internal charging current of the p.w.m. chip to increase to thereby charge capacitor C1 faster. The capacitor then reaches its threshold sooner than it ordinarily would and the frequency of the sawtooth waveform used by the chip for making p.w.m. comparisons is therefore speeded up.

The synchronization circuit described above performs its function by affecting the internal charging current of the 494 chip. It may be desirable to obtain the same synchronization without affecting the internal operation of the chip. FIG. 3b shows an alternative embodiment for circuit 90 which accomplishes this result. This alternative embodiment is designated as 90'. As circuit 90' differs from circuit 90 in respect to the charging of capacitor C1, only those differences are shown in FIG. 3b and discussed below.

The major difference between circuit 90' and previously described circuit 90 is that diode D2 of circuit 90 is replaced by current source 96 of circuit 90'. In addition, whereas diode D2 has its anode connected to pin 6 of the p.w.m. chip, source 96 has its output connected to chip pin 5 and, therefore, directly to timing capacitor C1. Upon the generation of the negative-going pulse at pin 3 of timer 92, the transistor Q1 contained in source 96 is pulsed on. The transistor then supplies an additional current to capacitor C1 which is additive to that being supplied the capacitor from the internal current source of the p.w.m. chip. The capacitor, therefore, reaches the threshold sooner than it normally would and the operating frequency of the p.w.m. chip is, therefore, controlled to be higher than it would be if determined solely by R1, R2 and C1.

In both FIGS. 3a and 3b there has been shown a diode D3 having its cathode connected to pin 3 of timer 92. In discussing the operation of circuits 90 and 90' it has been assumed that the synchronizing circuit is located in supply 20. Supply 24 also uses the p.w.m. technique and it is desirable that the operation of its p.w.m. circuit be synchronized to the master clock of the load. Diode D3 is used to convey the pulse from the timer output to supply 24. This pulse may be directly connected to the p.w.m. chip through, depending upon the embodiment, either diode D2 or source 96. It may, however, be beneficial to provide in supply 24 an arrangement identical to transformer T1 and timer 92 for receiving and reshaping the pulse conveyed to the supply by diode D3.

It is to be understood that the descriptions of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A synchronizing circuit for use in a power supply of the type which uses a waveform of predetermined shape for controlling the operation of the switchable power means contained therein, said supply being connected to a load having a master clock signal said signal having a predetermined frequency, said circuit comprising:
   (a) means responsive to said master clock signal for generating a syncing signal for each cycle of said master clock signal;
   (b) timing means connected to receive said syncing signal, said timing means generating pulses at a first predetermined rate in the absence of said syncing signal and generating pulses at a second predetermined rate in response to the occurrence of said syncing signal; and
   (c) circuit means having an internal clock frequency and connected to receive said timing means pulses said circuit means generating said waveform of predetermined shape with (i) a first predetermined frequency when said pulses are generated at said first predetermined rate and (ii) a second predetermined frequency when said pulses are generated at said second predetermined rate said second frequency being synchronized to said master clock frequency.

2. The circuit of claim 1 wherein said timing means includes a first circuit means for determining said first predetermined rate and a pulse generating means connected thereto and responsive to the absence of said synching signal to generate pulses at said first predetermined rate and pulses at said second rate in the presence of said syncing signal.

3. The circuit of claim 2 wherein said first circuit means is the series combination of a capacitor having one end connected to power supply common and the other end connected by a resistive means including at least an adjustable resistor to a source of voltage and to said pulse generating means.

4. The circuit of claim 2 wherein said first circuit means is the series combination of a parallel resistance-capacitance combination which has one end connected to power supply common and the other end connected by a resistance means to a source of voltage and to said pulse generating means.

5. The circuit of claim 2 wherein said pulse generating means includes means responsive to said syncing signal for determining said second predetermined rate.

6. The circuit of claim 2 or 5 wherein said pulse generating means includes means which act in combination with said first circuit means for determining the width of said pulses.

7. The circuit of claim 1 or 2 wherein said syncing signal generating means includes means to decouple said generating means from said timing means in the absence of said master clock.

8. The circuit of claim 1 wherein said circuit means includes a means for determining said internal clock frequency and said timing means includes means responsive to said pulses generated at said first predetermined rate and at said second predetermined rate for modifying said internal clock frequency determining means in a manner such that said circuit means generates said waveform at said first predetermined frequency when said timing means pulses are generated at said first predetermined rate and at said second predetermined frequency when said timing means pulses are generated at said second predetermined rate.

9. The circuit of claim 1 wherein said circuit means includes a means for determining said internal clock frequency said internal clock frequency determining means including a capacitor which is charged by a current in the absence of said timing means pulses at a predetermined rate, the time it takes said capacitor to reach a predetermined threshold determining said internal clock frequency.

10. The circuit of claim 9 wherein said timing means includes current source means responsive to the generation of said pulses generated at said first predetermined rate and at said second predetermined rate by said timing means to supply an additional charging current for said capacitor to thereby decrease said time it takes said capacitor to reach said threshold.

* * * * *